United States Patent [19]
Greimann

[11] Patent Number: 5,782,709
[45] Date of Patent: Jul. 21, 1998

[54] BELT TENSIONING DEVICE AND METHOD OF ADJUSTING BELT TENSION

[75] Inventor: Floyd D. Greimann, Sheffield, Iowa

[73] Assignee: Greimann Accu-Spray, Sheffield, Iowa

[21] Appl. No.: 598,777

[22] Filed: Feb. 8, 1996

[51] Int. Cl.$^6$ ............................................. F16H 7/08
[52] U.S. Cl. ........................ 474/110; 474/136; 198/813
[58] Field of Search ........................ 474/28, 110, 133, 474/135, 136; 198/813

[56] References Cited

U.S. PATENT DOCUMENTS

| | | | |
|---|---|---|---|
| 602,182 | 4/1898 | Preston et al. | 474/113 |
| 604,101 | 5/1898 | Wilhelm | 474/113 |
| 896,853 | 8/1908 | Nelson et al. | 254/424 |
| 897,827 | 9/1908 | Goble | 254/126 |
| 2,514,848 | 7/1950 | Davis | 254/98 |
| 2,739,784 | 3/1956 | Thompson et al. | 254/86 |
| 2,762,663 | 9/1956 | Sloyan | 308/6 |
| 2,829,928 | 4/1958 | Callaway | 304/29 |
| 3,580,094 | 5/1971 | Kraus | 474/132 X |
| 3,834,657 | 9/1974 | Freitas | 474/113 X |
| 4,055,329 | 10/1977 | Hammond | 254/86 |
| 4,469,036 | 9/1984 | Cook et al. | 474/115 X |
| 4,725,183 | 2/1988 | Smillie, III | 414/345 |
| 4,941,797 | 7/1990 | Smillie, III | 414/462 |
| 5,259,821 | 11/1993 | Bryant | 474/901 X |

*Primary Examiner*—Roger J. Schoeppel
*Attorney, Agent, or Firm*—Zarley, McKee, Thomte, Voorhees, & Sease

[57] ABSTRACT

A belt tensioning device is provided for a pulley drive mechanism including a motor with a drive shaft, a drive pulley mounted on a drive shaft, an idler pulley rotatably mounted in a pulley support, and a drive belt trained around the pulleys. The belt tensioning device includes a scissor jack connected between the motor and the idler pulley support. The jack is extendible so as to increase the spacing between the pulleys and thereby increase the belt tension, and retractable so as to decrease the spacing between the pulleys and thereby decrease the belt tension. The extension and retraction of the scissor arms of the jack is controlled by a draw bolt, or alternatively, by a spring which automatically provides tension on the belt. In the method of adjusting the belt tension, the jack is installed between the drive pulley and the idler pulley, and the jack is then actuated so as to adjust the spacing between the pulleys and thereby adjust the tension of the drive belt.

11 Claims, 3 Drawing Sheets

BELT TENSIONING DEVICE AND METHOD OF ADJUSTING BELT TENSION

BACKGROUND OF THE INVENTION

Belt drive systems are well known for use with pulley mechanisms to impart driving rotation from a drive pulley to an idler pulley via a belt trained about the pulleys. Typically, a motor with a drive shaft has a drive pulley mounted on the shaft and an idler pulley is rotatably mounted in a base or pulley support. A belt is trained about the pulleys such that upon actuation of the motor, the drive shaft and connected drive pulley rotate, with the drive belt thereby rotating the idler pulley.

In conventional pulley mechanisms, the tension in the belt is adjusted by loosening bolts and slidably adjusting the position of the motor or the idler pulley base support relative to one another. However, such a belt tensioning method is slow, and subject to slippage before the bolts are retightened.

Therefore, a primary objective of the present invention is the provision of an improved method of adjusting the tension of a drive belt in a pulley mechanism.

Another objective of the present invention is the provision of an improved belt tensioning device for pulley drive mechanisms.

Another objective of the present invention is the provision of a scissor jack which can quickly and easily adjust the tension of a belt trained about pulleys.

A further objective of the present invention is the provision of a belt tensioning device which is quickly and easily detachably mounted in a pulley drive mechanism so that the pulley motor can be transported between sites.

Another objective of the present invention is the provision of a belt tensioning device which is safe, durable, and efficient in operation, and which is economical to manufacture.

These and other objectives will become apparent from the following description of the invention.

SUMMARY OF THE INVENTION

The belt tensioning device of the present invention is used in conjunction with a pulley drive mechanism having a motor with a drive shaft, a drive pulley mounted on the drive shaft, an idler pulley mounted on a base or pulley support, and a drive belt trained about the pulleys. The device includes a scissor jack detachably connected between the motor and the idler pulley base. The jack is extendible so as to increase the spacing between the pulleys and thereby increase the belt tension, and is retractable so as to decrease the spacing between the pulleys and thereby decrease the belt tension.

The jack includes a base plate attached to the pulley base, and a motor mount plate upon which the motor is mounted. The motor mount plate has a first end pivotally connected to the base plate. Scissor arms are pivotally connected between the base plate and the second end of the motor mount plate. A draw bolt extends between the scissor arms and the base plate and is rotatable in one direction to extend the scissor arms and rotable in the opposite direction to retract the scissor arms. Alternatively, a spring may be extended between the scissor arms and the motor mount plate so as to normally urge the jack to the extended position, and thereby automatically place tension on the belt.

The method of adjusting the belt tension according to the present invention includes the step of installing the jack between the drive pulley and the idler pulley, and actuating the jack so as to adjust the spacing between the pulleys, and thereby adjust the tension of the belt. The jack is actuated by rotating the draw bolt, or alternatively, by the compression or tensile forces of the spring.

DETAILED DESCRIPTION OF THE DRAWINGS

Figure 1:
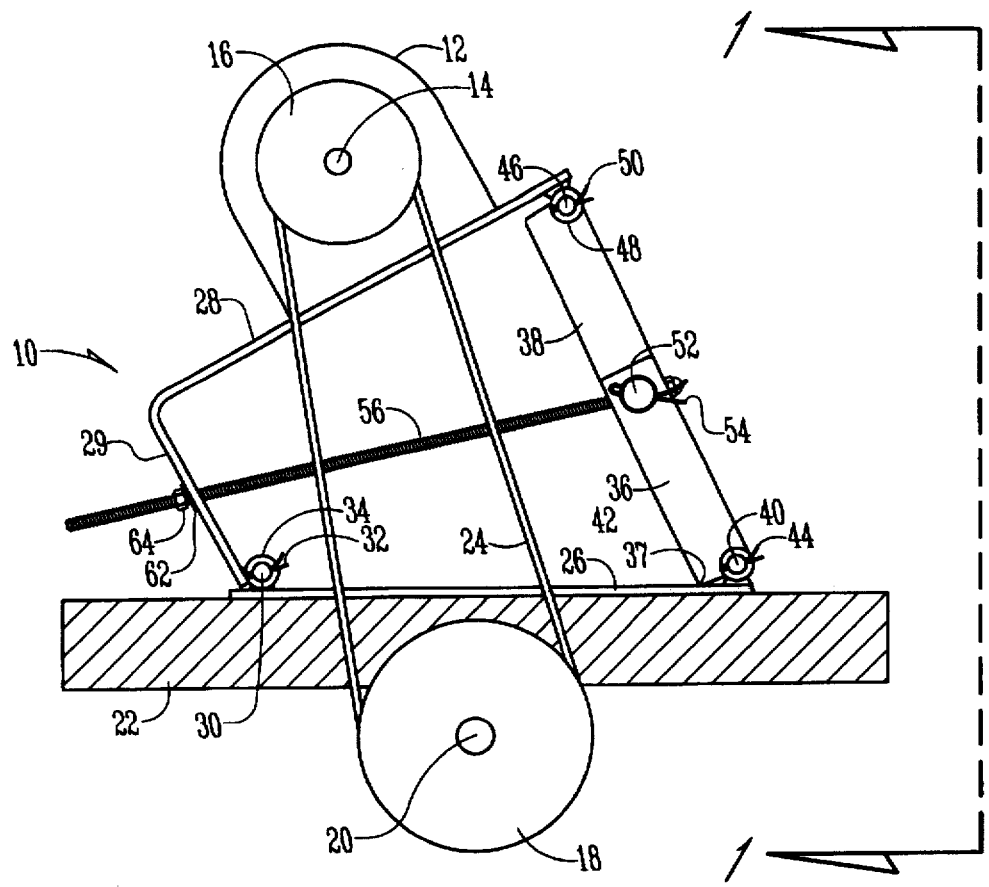
FIG. 1 is a side elevational view of the belt tensioning scissor jack of the present invention, installed on a pulley drive mechanism with the jack being in an extended position to increase tension on the belt.

With reference to the drawings, the belt tensioning device of the present invention is generally designated by the reference numeral 10. The device 10 is a jack assembly, and preferably a scissor jack which is operable to adjust the tension of a belt in a pulley drive mechanism.

More particularly, the drive mechanism includes a motor 12 having a drive shaft 14 extending therefrom, with a drive pulley 16 fixed on the drive shaft 14. An idler pulley 18 is fixed upon an idler pulley shaft 20, which is rotatably supported in a base or pulley support 22. A belt 24 is trained about the pulleys 16 and 18, such that upon actuation of the motor 12, the drive pulley 16 will impart rotation to the idler pulley 18 via the belt 24. These elements 12–24 of the pulley drive mechanism are conventional.

The scissor jack assembly 10 includes a base plate 28 and a motor mount plate 26. The motor mount plate 28 is shown to be substantially L-shaped, but the exact shape of the plate 28 is not critical. The leg 29 of the mount plate 28 is pivotally hinged to the base plate 26 by a removable pin 30. A cotter pin 32 releasably maintains the hinge pin 30 in the axially aligned hinge eyes or bushings 34 of the plates 26, 28.

The jack assembly 10 includes scissor arms which pivotally extend between the plates 26, 28. Preferably, the scissor jack assembly 10 includes a pair of lower scissor arms 36 and a pair of upper scissor arms 38. A hinge pin 40 extends through eyelets or bushings 42 on the base plate 26 and through holes in the lower ends of the lower arms 36, thereby pivotally connecting the lower scissor arms 36 to the base plate 26. The hinge pin 40 is removably insertable through the eyelets 42 and the lower arms 36, and is maintained in an operative position by a cotter pin 44. Similarly, the upper scissor arms 38 are pivotally connected to the motor mount plate 28 by a hinge pin 46 extending through eyelets or bushings 48 on the motor mount plate 28 and through holes in the upper ends of the upper arms 38. The hinge pin 46 may be permanently installed, or removably installed through the use of a cotter pin 50.

The upper ends of the lower arms 36 and the lower ends of the upper arms 38 overlap one another and have aligned holes through which a middle hinge pin 52 extends. The hinge pin 52 is retained in position by a cotter pin 54 at each end of the pin 52. Thus, the lower and upper scissor arms 36, 38 are respectfully pivotally hinged to the lower and upper plates 26, 28, as well as to one another. Thus, the scissor arms 36, 38 are movable between an extended position shown in FIG. 1 and a retracted position shown in FIG. 2.

The degree of extension or retraction is controlled by a draw bolt 56. The draw bolt 56 has one end extending through an aperture 58 in the motor mount plate 28, and a second end extending through an aperture 60 in the middle hinge pin 52.

The head of the bolt 56 is positioned on the outer side of the middle hinge pin 52, while a washer 62 and a threadable nut 64 are provided on the opposite end of the draw bolt 56 on the exterior side of the motor mount plate 28.

As the nut 64 is threaded upwardly upon the bolt 56, the scissor arms 38 are drawn toward the leg 29 of the mount plate 28, thus pivoting the mount plate 28 away from the base plate 26, and increasing the spacing between the pulleys 16, 18, thereby increasing the tension upon the belt 24. Conversely, as the nut is threaded downwardly upon the bolt 56, the scissor arms 36, 38 are allowed to pivot outwardly away from the mounting plate leg 29, thus allowing the mount plate 28 to pivot toward the base plate 26, and decreasing the spacing between the pulleys 16, 18, and thereby lessening or releasing the tension upon the belt 24. It may not be necessary to fully extend the jack assembly 10, as seen in FIG. 1, in order to have sufficient tension on the belt 24. Rather, the jack assembly may be partially extended to a position between the positions shown in FIGS. 1 and 2.

Figure 3:
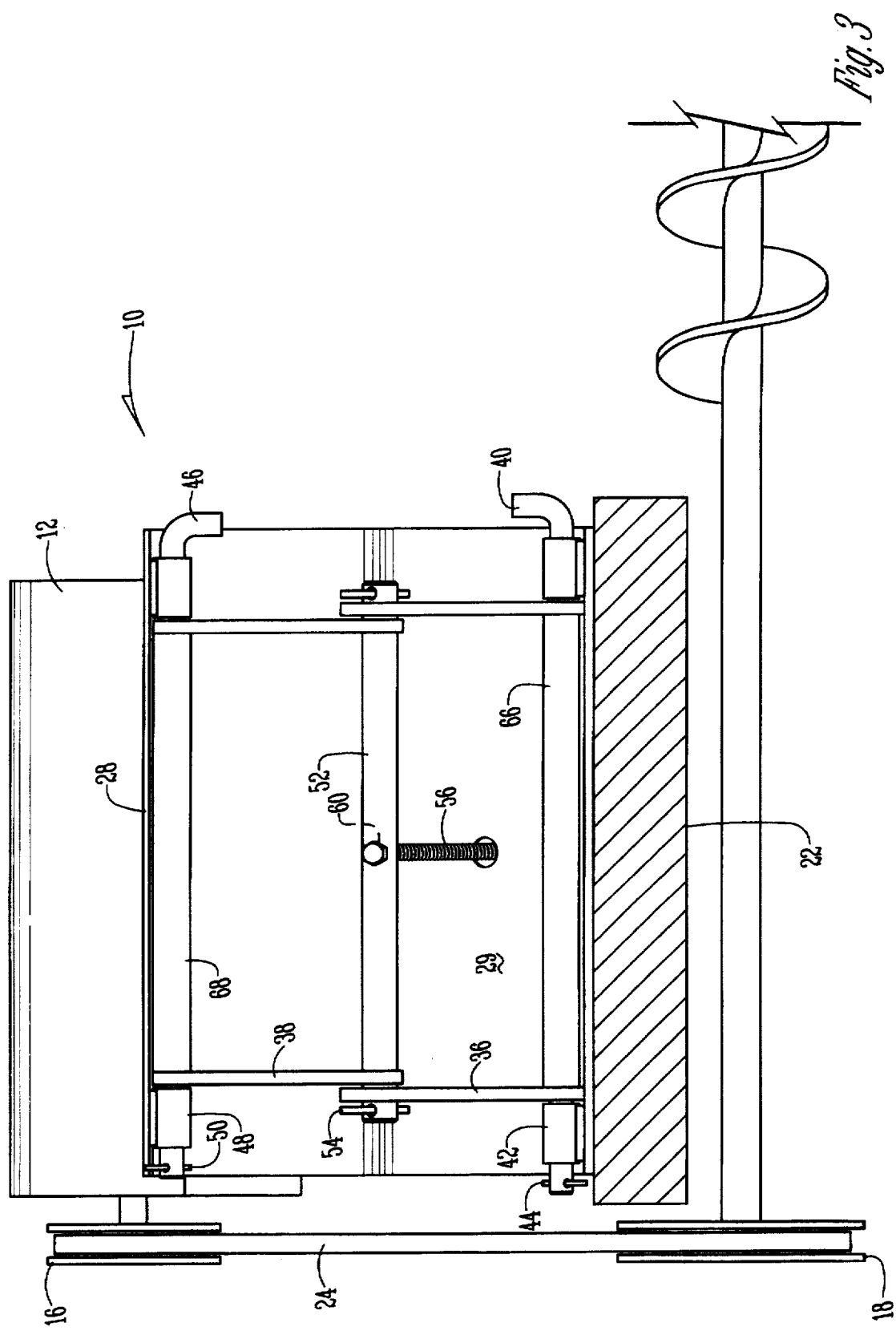
FIG. 3 is an end elevational view taken along lines 3—3 of FIG. 1.

It is noted that preferably, on at least the lower scissor arms 36, the hole in the lower end of the arms is offset with respect to the longitudinal center line of the arms. Accordingly, the inner lower corner 37 of the arms will abut or engage the base plate 26, as seen in FIG. 1, thereby serving as a stop mechanism to prevent over-center extension of the scissor arms. Also, preferably, a tube 66 rigidly interconnects the lower arms, and a tube 68 rigidly connects the upper scissor arms 38. The tubes 66, 68 cause the connected arms to pivot in unison, and thereby prevents twisting of the arms relative to one another. The hinge pins 40 and 46 extend through the tubes 66, 68, respectively, as best seen in FIG. 3.

Figure 2:
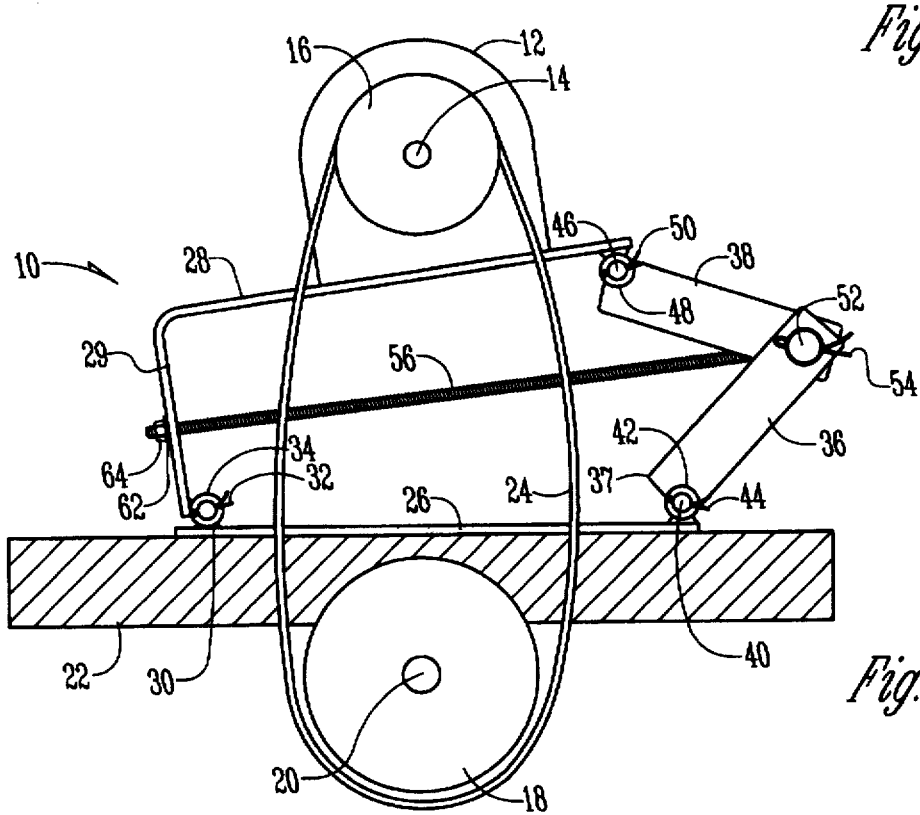
FIG. 2 is a view similar to FIG. 1 showing the jack in a retracted position to decrease the tension on the belt.

To use the jack assembly of the present invention, the base plate 26 is secured to the idler pulley support base 22 in any convenient manner, such as welding, bolts or clamps. The motor 12 is mounted upon the motor mount plate 28 with bolts (not shown) which extend through holes in the plate 28. With the scissor arms 36, 38 in the retracted position, as shown in FIG. 2, the belt 24 is placed around the pulleys 16 and 18. The tension on the belt can then be tightened by threading the nut 64 upwardly along the draw bolt 56 so as to pull the arms 36, 38 inwardly towards the extended position, shown in FIG. 1. It is understood that the belt 24 may be sufficiently tightened before the arms 36, 38 reach the fully extended position. In order to loosen the belt tension, the nut 64 is threaded outwardly along the draw bolt 56, such that the arms 36, 38 partially collapse towards the retracted position, thereby decreasing the distance between the pulleys 16, 18.

Figure 4:
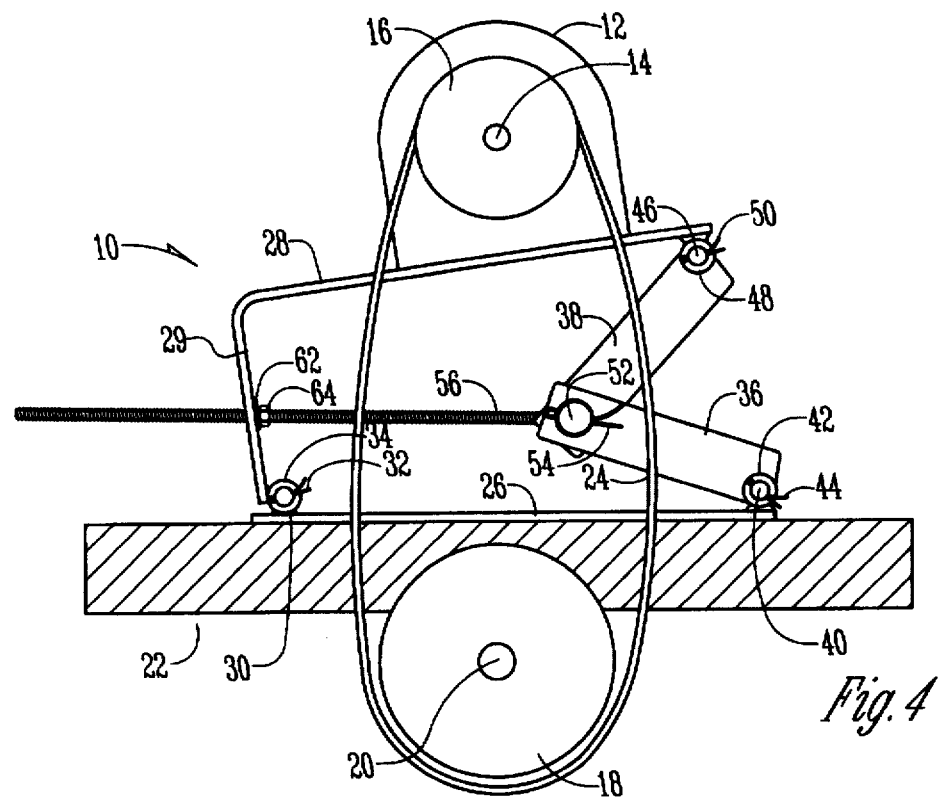
FIG. 4 is a side elevational view showing an alternative embodiment of the scissor jack, wherein the scissor arms extend inwardly, as opposed to outwardly as shown in FIG. 2.

A first alternative embodiment of the present invention is shown in FIG. 4, wherein the scissor arms 36, 38 are angularly reversed. In this orientation, the arms 36, 38 fold inwardly to the retracted position, as opposed to being folded outwardly as in FIG. 2. This alternative arrangement is desirable if there are spaced restrictions or other obstructions. In this alternative embodiment, the nut 64 is threaded outwardly towards the end of the draw bolt 56 to thereby push the scissor arms towards the extended position, thereby increasing the space between the pulleys 16, 18 and thereby increasing the tension of the belt 24.

Figure 5:
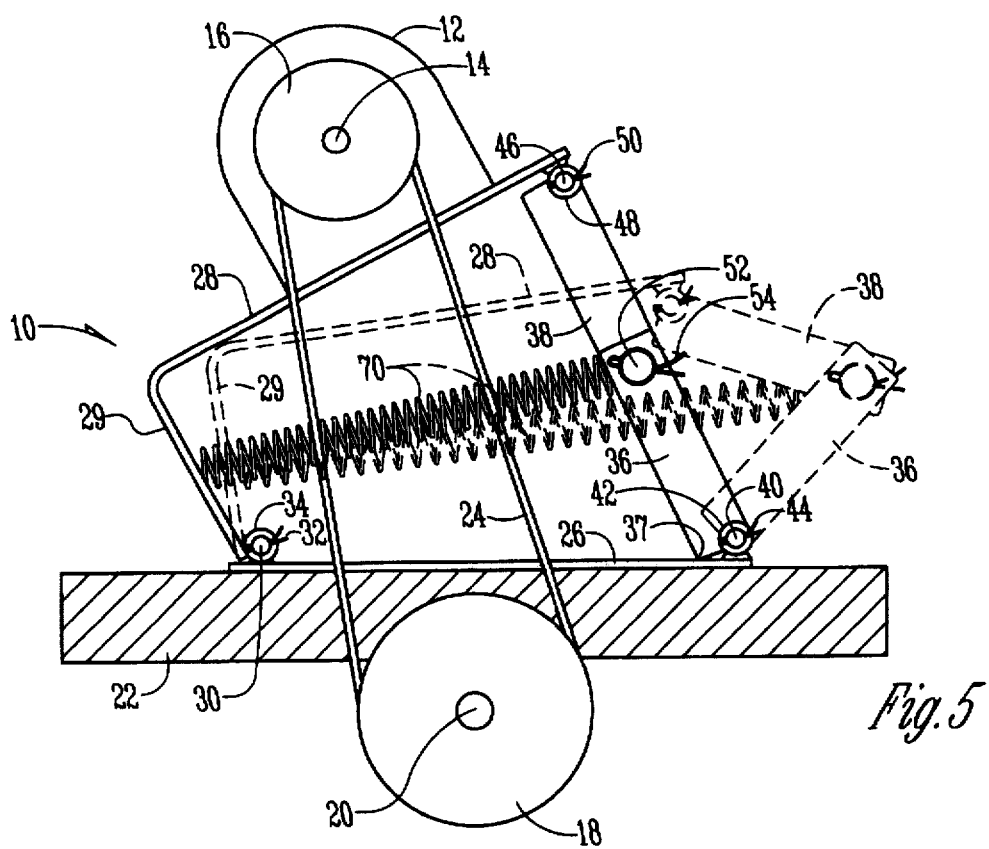
FIG. 5 is a side elevation view of another alternative embodiment of the scissor jack having a spring for automatically placing the pulley belt under tension.

A further embodiment of the invention is shown in FIG. 5, wherein the draw bolt 56 has been replaced with a spring 70. The ends of the spring are fastened to the leg 29 of the motor mount plate 28 and to the middle hinge pin 52. The spring 70 normally urges the scissor arms 36, 38 to the extended position so as to automatically provide tension on the belt 24. It is understood that either a compression spring or a tension spring can be utilized accordingly on either of the embodiments shown in FIGS. 2 or 4.

In heavy duty applications, it may be necessary to provide multiple draw bolts or springs for actuating the scissor jack assembly 10. Also, it is sometimes desirable to use a the motor at multiple sites, or to remove the motor for security reasons, such as theft. In such instances, the cotter pins 32 and 44 can be quickly and easily pulled and the hinge pins 30 and 40 quickly and easily pulled, such that the motor 12, the attached mount plate 28, the scissor arms 36, 38 and the draw bolt 56 can be removed and transported to a desired location, with only the base plate 26 remaining attached to the pulley support base 22.

It is further understood that the scissor jack assembly 10 of the present invention will function in any angular orientation. Thus, while the drawings show the base plate 26 being mounted on a horizontally disposed pulley support base 22, the scissor jack assembly can also be mounted on a vertical support, or a support having any other angular orientation.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A method of adjusting the tension of a drive belt in a pulley drive mechanism including a motor with a drive shaft, a drive pulley operatively mounted on the drive shaft, an idler pulley rotatably mounted in a base, and a drive belt trained about the pulleys, the method comprising:

installing a scissor jack between the drive pulley and idler pulley, the scissor jack including a base plate, a motor mount plate pivotally connected to the base plate, and scissor arms pivotally extending between the base plate and mount plate;

attaching the base plate to the base of the pulley mechanism and mounting the motor on the mount plate; and actuating the jack to adjust the spacing between the pulleys and thereby adjust the tension of the drive belt.

2. The method of claim 1 further comprising rotating a draw bolt extending between the scissor arms and the mount plate to actuate the scissor jack.

3. The method of claim 1 further comprising automatically actuating the jack by extending a spring between the scissor arms and mount plate so as to automatically increase the tension of the belt.

4. A belt tensioning device for a pulley drive mechanism including a motor with a drive shaft, a drive pulley operatively mounted on the drive shaft, an idler pulley rotatably mounted in a base, and a drive belt trained about the pulleys, the device comprising:

a scissor jack connected between the motor and the base and being extendible so as to increase the spacing between the pulleys and thereby increase the belt tension, and being retractable so as to decrease the spacing between the pulleys and thereby decrease the belt tension; and the scissor jack having a base plate attached to the base of the pulley mechanism, a motor mount plate upon which the motor is mounted and having a first end pivotally connected to the base plate, and scissor arms pivotally connected between the base plate and motor mount plate.

5. The device of claim 4 wherein the scissor arms include a pair of upper arms and a pair of lower arms.

6. The device of claim 4 further comprising a draw bolt extending between the scissor arms and the motor mount plate, and being rotatable in one direction to extend the jack so as to increase tension on the belt, and being rotatable in the opposite direction to retract the jack, so as to decrease tension on the belt.

7. The device of claim 6 further comprising a spring extending between the scissor arms and the motor mount plate to normally urge the jack to the extended position so as to automatically place tension on the belt.

8. The device of claim 4 wherein the scissor arms and the motor mount plate are releasably connected to the base plate.

9. The device of claim 4 wherein the scissor arms are reversibly mountable between the base plate and motor mount plate.

10. The device of claim 4 wherein at least one of the scissor arms includes a stop member engageable with one of the base plate and mount plate to prevent over-center extension of the arms.

11. The device of claim 5 wherein the upper arms are rigidly interconnected and the lower arms are rigidly interconnected.

* * * * *